United States Patent
Van de Water

[15] 3,693,817
[45] Sept. 26, 1972

[54] VEHICLE TOP BOAT LOADER AND CARRIER

[72] Inventor: Francis M. Van de Water, 2330 Lantana Road, Box 9A, Lantana, Fla. 33460

[22] Filed: Dec. 4, 1970

[21] Appl. No.: 95,279

[52] U.S. Cl. ................................................214/450
[51] Int. Cl. ..............................................B60r 9/00
[58] Field of Search ...........214/450; 224/42.1, 42.03

[56] References Cited

UNITED STATES PATENTS

| | | | |
|---|---|---|---|
| 2,828,035 | 3/1958 | Kuchinskie | 214/450 |
| 2,765,940 | 10/1956 | Nelson | 214/450 |
| 3,343,696 | 9/1967 | Morrison | 214/450 |
| 2,654,515 | 10/1953 | Svoboda | 224/42.1 H |

*Primary Examiner*—Gerald M. Forlenza
*Assistant Examiner*—John Mannix
*Attorney*—Eugene F. Malin

[57] ABSTRACT

An improved non-complex device for aiding a single operator desiring to load and unload a boat onto and from the top of an auto. The device includes a detachable roof anchor means with a transverse boat support and tie down means, a rest post, a detachable bumper support for holding the vertically movable rest post at various elevated positions, a track member connected to the rest post and the roof anchor means, and a roller means for supporting the boat as it moves along the track member. The front of the boat is placed on the track member adjacent the rest post with the roller means therebetween. The rear of the boat is then lifted and moved toward the rest post while pushing the front of the boat up the track member onto the transverse boat support. Thereafter the rest post is elevated step by step to raise the rear of the boat upward to the height of the transverse boat support. The boat is then secured to the auto roof or removed in a reverse manner.

4 Claims, 5 Drawing Figures

PATENTED SEP 26 1972 3,693,817
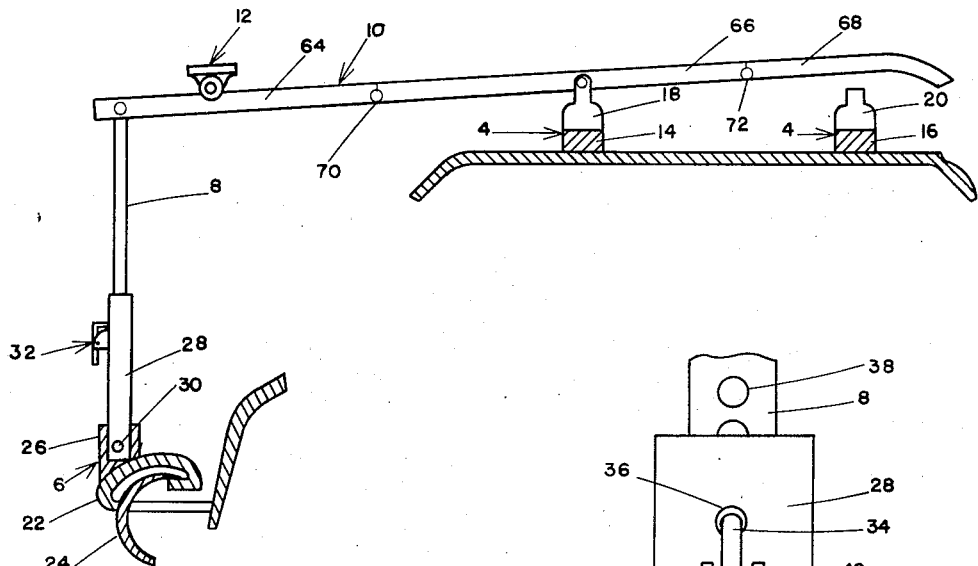
FIG. 1
FIG. 2
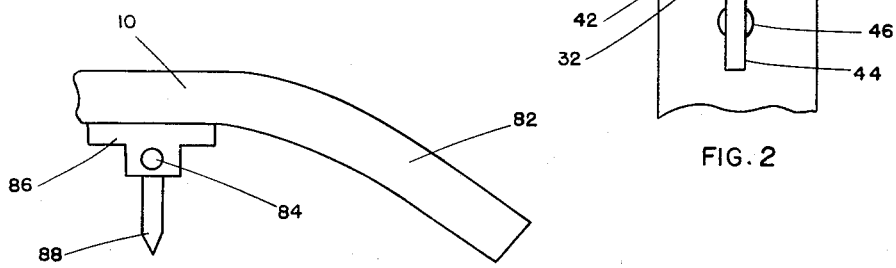
FIG. 3
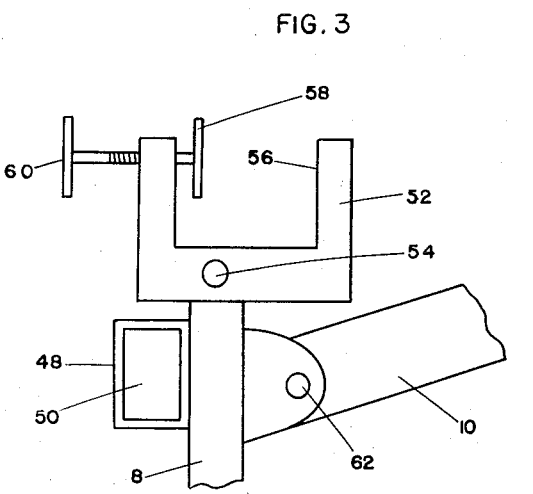
FIG. 4
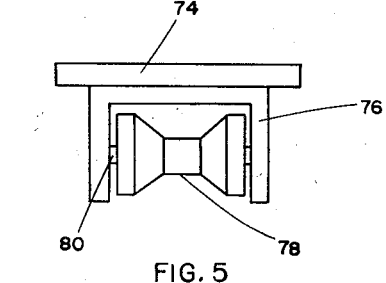
FIG. 5
INVENTOR.
FRANCIS M. VAN DE WATER
BY

VEHICLE TOP BOAT LOADER AND CARRIER

BACKGROUND OF THE INVENTION

The present invention relates to a new and improved non-complex boat loader and carrier for the top of an auto, and, more particularly, to a boat loader and carrier that can be easily operated by one individual.

In the past, car top boat loaders and carriers required two or more persons to operate the device in order to load and unload a boat from the top of an auto. Other car top boat loaders and carriers are either costly to manufacture or complex in design. As is well known, many car top loaders and carriers utilize costly hand operated winches to raise and lower the vessel. Various prior devices are bulky in design and difficult to operate.

SUMMARY OF THE INVENTION

A non-complex auto device for loading, carrying, and unloading a boat. The device includes a detachable roof anchor means, a detachable bumper support, a movable rest post connected to the bumper support, a track member connected between the rest post and the roof anchor means, and a roller means for carrying the boat of the track member. The detachable roof anchor means may include one or more transverse auto roof supports and a connecting support means for the track member. The transverse auto roof support includes roof connecting suction cups, roof gutter connectors, and boat tie down means. The detachable bumper support including a bumper clamp, a removable upright support post connected to the bumper clamp, and a ratchet means connected to the upright support post for holding the rest post in various elevated positions. The rest post includes a plurality of openings to receive the pawl in the rachet means. A track member including a plurality of collapsible members, a pivot connector at one end of the track member to connect the track member to the upper end of the rest post, and a second pivot connector to connect the track member to the connecting support means on one roof anchor means. The roller means includes a boat connecting plate and a free rotating roller connected to the plate.

It is an object of this invention to provide a non-complex boat loader and unloader.

Another object of this invention is to provide a vertically movable rest post and a movable track connected to the rest post and a roof anchor or support means to provide a boat loader and carrier that is easily operable by one operator.

A further object of this invention is to provide a collapsible boat loader having a minimum number of parts.

An additional object of this invention is to provide a low cost boat loader and carrier.

In accordance with these and other objects which will be apparent hereinafter, the instant invention will now be described with particular reference to the accompanying drawing.

A BRIEF DESCRIPTION OF THE DRAWING

FIG. 1 is a side view of the auto loading and carrying device partially in cross section with a portion of an auto bumper and roof illustrated in cross section;

FIG. 2 is a rear view of the ratchet means and a portion of the support post and rest post;

FIG. 3 is a side view of an alternate design of the distal end of the track member and of the pivot connection between the track member and the transverse support;

FIG. 4 is a side view of an alternate design of the track member, and rest post connection illustrating a boat clamp; and FIG. 5 is a rear view of the roller means.

DESCRIPTION OF PREFERRED EMBODIMENTS

Referring now in detail to the drawing, wherein an embodiment of the invention is shown, and referring, particularly, to FIG. 1, the loading and carrying device, generally designated by numeral 2, includes a detachable roof anchor means 4, a detachable bumper support 6, a movable rest post 8, connected to the bumper support, a track member 10 connected between the rest post and the roof anchor means, and a roller means 12 for carrying the boat on the track member 10.

The detachable roof anchor means may include two transverse auto roof supports 14 and 16, as shown in FIG. 1. The transverse auto roof supports may be similar to any well known auto racks, not shown, having a transverse member with suction cup roof connectors, gutter tie down clamps, and boat tie down straps. The rear transverse member 14 includes a pivot connecting plate 18 that is pivotally connected to the central portion of the track member 10. The forward transverse member 16 includes a generally Y-shaped gripping clamp 20 that grips both sides of the track member 10 when the forward portion of the track member is rotated downwardly into the clamp.

The detachable bumper support 6 includes any well known bumper clamp or bumper attachment, or clip on type devices as illustrated in FIG. 1 by numeral 22. The clip on device is placed over the upper edge of the bumper 24 on the auto. The clip on device 22 includes a stand 26 that holds the bottom of the removable upright support post 28. The stand holds the support post 28 in a vertical position. Removable pin 30 connects stand 26 to the upright support post 28. A ratchet means 32 is connected to the upper portion of the support post 28 to support the rest post in various elevated positions. The ratchet means 32, as shown in FIG. 2, includes a pawl 34 that moves into and out of opening 36 in the upright support post 28 to engage various holes, as illustrated at 38 in the rest post 8. The pawl 34 is pivotally connected to members 40 by pin 42. The other end of the ratchet means shown at 44 is biased outwardly by spring 46.

The rest post 8 includes a plurality of openings 38 to support the rest post in various elevated positions in the upright support post 28. The upper end of the rest post 8 is pivotally connected to the track member 10. The front of the boat is placed on the track adjacent the rest post 8 when the rest post is in its lowermost position. The roller means 12 is placed between the boat and track means. When the rear of the boat is moved forward to a position beyond the rest post and the boat is supported on the first transverse roof support 14, the rest post 8 is raised to its uppermost position. The forward portion of the truck member is connected to the Y-clamp 20 when the rest post 8 is placed in its uppermost position. The forward portion of the boat is brought to rest on the second transverse roof support 16 when the rest post 8 is placed in its uppermost position. The boat may then be tied down on the roof of the auto, or removed in a reverse manner.

Referring now to FIG. 4, the upper portion of the rest post 8 may include a rest bar holder 48. The long rest bar, not shown, may be placed in opening 50. The operator may use the rest bar to raise or lower the rest post 8. The operator may also use the rest bar to support the rear of the boat when the front of the boat is moved part of the way up the track number 10.

When only one transverse roof support is used, the rest post 8 may include a clamp device 52, for holding the rear of the boat on the rest post. The front of the boat is supported by the single transverse roof support and the rear of the boat is supported by the rest post the clamp device 52 is pivotally connected to the upper end of the rest post 8 by pin 54. The stern of the boat is clamped between surface 56 and movable member 58. The movable member 58 is activated by rotating handle 60. When the clamp device 52 is used, the track member 10 is pivotally connected to the rest post 8 by pin 62.

The track member, as shown in FIG. 1, includes a plurality of collapsible members 64, 66, and 68. The collapsible members may be pivotally connected at 70 and 72. The track member may be held in its in-use position by locking means not shown.

The roller means 12, shown in FIG. 5, may be attached to the bow of the boat to be loaded on the device. The roller means 12 includes a plate 74 having a U-shaped flange 76 connected thereto. The roller 78 is rotatably connected to the U-shaped flange 76 by axle 80.

The distal end of the track member 10 may be bent downwardly at 82 so that after the bow of the boat reaches the forward position and while the stern of the boat is being raised, the bow of the boat and the roller will be raised off of the bent track portion 82 by engagement of the sides of the boat with the single transverse roof support. Therefore the boat is automatically placed in a tie down position with the front gunnels supported by the transverse roof support and not by the roller 74 and track member 10.

The pivot connection 18 may be varied to include a pivot pin 84 connected to holder 86 connected to the track member 10. The pivot pin 84 may include a pin portion 88 that fits into a hole in the transverse support.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. An auto roof boat loading device for use on an auto to load a boat comprising,
    a vertically movable rest post,
    a bumper support means connected to said vertically movable rest post, said support means includes a holding means to support the rest post in various positions,
    a track member pivotally connected to the upper portion of the rest post,
    a pivot member connected to the track member, said pivot member connected to the roof of the auto,
    a roller means to roll along said track member for supporting the bow of the boat on the loading device,
    a transverse roof member connected between said pivot member and the roof of the auto, and
    said track member includes a downwardly projection portion for lowering the boat onto said transverse member.

2. A one man auto roof boat loading device for use on an auto to load a boat comprising,
    a generally vertically movable rest post,
    a support means connectable to the rear of the auto and to said rest post to support said rest post for generally vertical movement,
    a holding means connected between said rest post and said support means to fix said rest post in various elevated positions,
    a single track member with one portion connected to the upper portion of said rest post and the other portion of said track member connectable to the roof of the auto,
    means for movably connecting one end of the boat to said track member for movement along the track between said one portion and said other portion,
    at least one transverse support member connected to said track member for fixing the position of the gunnels of the boat in relation to said track member,
    whereby one end of the boat may be raised to connect the boat to said movable means and said one portion of the track adjacent said rest post when said rest post is located in its lower position, and thereafter the other end of the boat may be raised and moved toward said rest post moving the one end of the boat along the track member toward the other end of the track member, and thereafter raising the other end of the boat and said rest post to the upper position for transporting the boat, and said rest post may be moved up and down to move said track between a generally horizontal position and an inclined position.

3. An auto roof boat loading device as set forth in claim 2, wherein,
    the other portion of said track member is connected to the roof of the auto by a pivot member,
    said support means is an auto bumper connection device, and including
    a transverse auto roof support member connected to said pivot member.

4. An auto roof boat loading device as set forth in claim 3, wherein,
    said support means includes a ratchet means to hold said rest post in various elevated positions.

* * * * *